(12) United States Patent
Hiltgen et al.

(10) Patent No.: US 8,949,585 B2
(45) Date of Patent: Feb. 3, 2015

(54) IN-PLACE CONVERSION OF VIRTUAL MACHINE STATE

(75) Inventors: Daniel Hiltgen, San Jose, CA (US); Rene W. Schmidt, Risskov (DK)

(73) Assignee: VMware, Inc., Palo Alto, CA (US)

( * ) Notice: Subject to any disclaimer, the term of this patent is extended or adjusted under 35 U.S.C. 154(b) by 1307 days.

(21) Appl. No.: 12/051,664

(22) Filed: Mar. 19, 2008

(65) Prior Publication Data

US 2009/0094603 A1 Apr. 9, 2009

Related U.S. Application Data

(60) Provisional application No. 60/978,538, filed on Oct. 9, 2007.

(51) Int. Cl.
*G06F 9/44* (2006.01)
*G06F 9/455* (2006.01)

(52) U.S. Cl.
CPC .......... *G06F 9/4406* (2013.01); *G06F 9/45558* (2013.01); *G06F 2009/45562* (2013.01)
USPC .................................................. 713/2; 718/1

(58) Field of Classification Search
CPC .................................................... G06F 9/4406
USPC .................................................. 718/1; 713/2
See application file for complete search history.

(56) References Cited

U.S. PATENT DOCUMENTS

| 7,082,598 | B1 | 7/2006 | Le et al. |
| 7,356,677 | B1 * | 4/2008 | Rafizadeh ..................... 713/1 |
| 2005/0229175 | A1 * | 10/2005 | McCrory et al. ............. 717/177 |
| 2006/0265582 | A1 * | 11/2006 | Fan et al. ....................... 713/2 |

OTHER PUBLICATIONS

InfoWorld Virtualization Report "VMware isn't the only New Converter Tool in Town", http://weblog.infoworld.com/virtualization archives/2007/011vmware_isnt_the.html, Jan. 31, 2007, 2 pages.
Vance, Ashlee, "VMware wallops Microsoft with white paper", The Register, Feb. 26, 2007, 4 pages, http://www.theregister.co.uk/2007/02J26/vmware_ms_spat/print.html.
Neiger, Gil et al., "Intel Virtualization Technology: Hardware Support for Efficient Processor Virtualization", Intel Technology Journal, vol. 10, Issue 3, Aug. 10, 2006, pp. 167-178.
VMware Converter 3, Product Datasheet, VMware, 2007, 2 pages.
VMware Technical Note, "Virtual Machine to Physical Machine Migration", 1998-2004, pp. 1-22.

(Continued)

*Primary Examiner* — Andrew Caldwell
*Assistant Examiner* — John Lindlof

(57) ABSTRACT

One embodiment of the present invention includes a method of making a bootable image for a computer, wherein the bootable image corresponds to a first virtual machine but is bootable on a target machine, the method comprising: (a) instantiating the first virtual machine within a virtualization system and executing computations thereof, the computations operating upon an encapsulation of virtual machine state for the instantiated virtual machine; and (b) introducing into the encapsulation, a boot loader that defines at least one transformation to be performed on the encapsulation to allow the target machine to boot from the virtual machine state.

34 Claims, 10 Drawing Sheets

(56) References Cited

OTHER PUBLICATIONS

EasyVMXI:.vmx Config Generator, "EasyVMXI: Create Virtual Machine", 2 pages, http://www.easyvmx.com/cgi-bin/vmcreate.cgi?filetime=2006-11-29-22%3A18T3A36&vmname=M . . .

VMware Technology Network, VMware Workstation 4.5, "Configuring Dual- or Multiple-Boot Systems to Run with VMware Workstation", 3 pages, http://www.vmware.com/support/ws45/doc/disks_dualmult_ws.html.

VMware Technology Network, VMware Workstation 4.5, "Installing an Operating System onto a Raw Partition from a Virtual Machine", 3 pages, http://www.vmware.com/support/ws45/doc/disks_instraw_ws.html.

VMware PV2 Assistant Product Datasheet, "Utility for physical-to-virtual machine migration", 2006, 2 pages.

InfoWorld Virtualization Report, "VMware Making P2V Easier with VMware Converter 3", Jan. 29, 2007, 2 pages, http://weblog.infoworld.com/virtualization/archives/2007/01/vmware_making_p.html.

VMware Technical Note, "VMware Virtual Disks Virtual Disk Format 1.0", 1998-2006, pp. 1-13.

\* cited by examiner

IN-PLACE CONVERSION OF VIRTUAL MACHINE STATE

CROSS-REFERENCE TO RELATED APPLICATION(S)

This application claims the benefit of U.S. Provisional Application No. 60/978,538, filed Oct. 9, 2007.

BACKGROUND

1. Field of the Invention

One or more embodiments of the present invention relate generally to computational systems and, more particularly, to methods for allowing a physical machine to operate from an encoding of virtual machine state.

2. Description of the Related Art

Virtualization techniques have a long history in the development of hardware and software systems. Virtual memory, virtual (in-memory) disk storage, and operating system virtual machines are but a few examples of techniques that have long been employed in conventional computational systems. Generally, virtualization techniques seek to abstract underlying resources from layers of functionality (typically software) that employ the resources. Today, partitioning a physical resource for presentation (to multiple resource consumers) as an isolated, but functionally complete instance of the virtualized resource is employed in many modern software systems, including modern operating systems.

While virtualization has long been employed as a method for partitioning individual resources (e.g., in virtual memory or for multi-threaded software executed on a single preemptively scheduled processor), in recent years, virtualization techniques have been employed on a more comprehensive scale. As a result, commercially-available virtualization systems (such as those available from VMware, Microsoft and XenSource) seek to virtualize hardware systems more completely, for example, by presenting an operating system or other software system with a virtualization of underlying hardware.

In general, virtualization technology has proven useful in data center environments, where it has facilitated server consolidation and has been used for server replication, downtime management, fault tolerance and disaster recovery. Virtualization has been applied at the desktop or workstation to facilitate support for multiple operating system instances and to streamline software development and test activities using a series of virtual systems provisioned to correspond to a range of expected or actual deployments.

Despite these uses of virtualization systems, there are situations in which it may be useful to execute software on a traditional, hardware-based platform. For example, application and/or operating system software vendors may require that a bug, fault or error be replicated on a "real" hardware system. In some cases, an ability to migrate from a virtual system to a hardware system may facilitate certain disaster recovery or capacity migration strategies. Alternatively, the mere availability of a method to convert a virtual machine back to a form suitable for execution on a physical machine (if ever necessary) may engender organizational confidence in a decision to deploy production systems using virtualization technology.

SUMMARY

Embodiments of the present invention include methods, systems, apparati, computer program products and other tangible realizations of techniques to convert a virtual machine to a form suitable for execution on a physical machine. In particular, one embodiment of the present invention is a method of making a bootable image for a computer, wherein the bootable image corresponds to a first virtual machine but is bootable on a target machine, the method comprising: (a) instantiating the first virtual machine within a virtualization system and executing computations thereof, the computations operating upon an encapsulation of virtual machine state for the instantiated virtual machine; and (b) introducing into the encapsulation, a boot loader that defines at least one transformation to be performed on the encapsulation to allow the target machine to boot from the virtual machine state.

BRIEF DESCRIPTION OF THE DRAWINGS

The use of the same reference symbols in different drawings indicates similar or identical items.

DESCRIPTION

Figure 1:
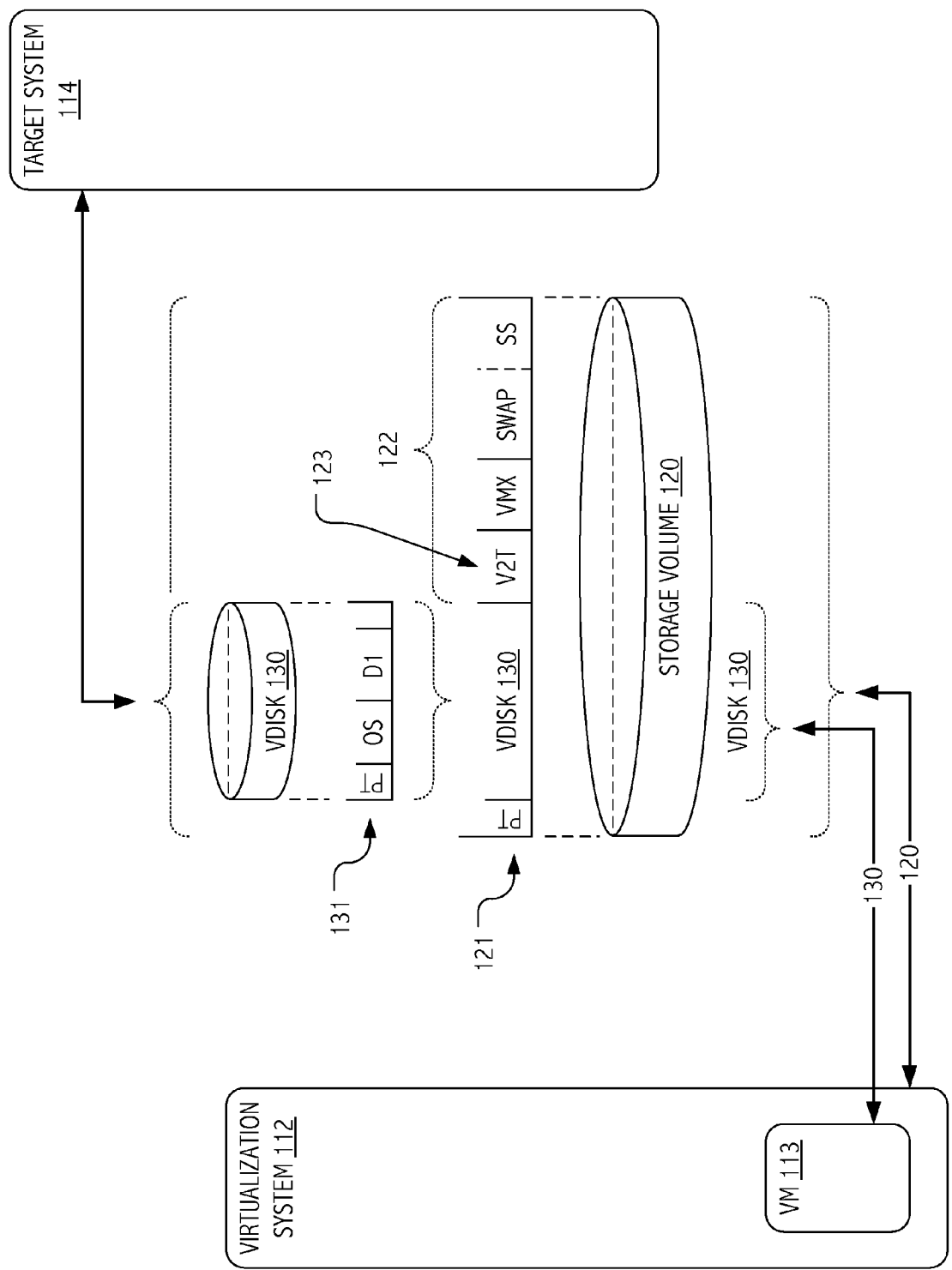
FIG. 1 depicts an encapsulated representation of virtualization system state and configuration data that, consistent with one or more embodiments of the present invention may be employed as a boot (or load) image for a target system.

One or more embodiments of the present invention include methods for encoding virtual machine state in ways that facilitate migration of corresponding virtual machine computations for execution on a physical machine or other execution target. Using one or more embodiments of encapsulation methods described herein, it is possible to encode virtual machine state in a way that provides isolation and/or security for certain types or portions of the virtual machine state data, while still allowing a virtualization system to expose other types or portions of such data to a guest application or operating system.

In one or more embodiments, an encoding of virtual machine state is augmented with a boot loader that defines at least one transformation to allow a target system to boot from virtual machine state. Typically, a virtual machine and a target machine will differ in at least one significant way, so that absent the transformation, a direct boot (or load) of virtual machine state (including e.g., the state of disk partitions encode an operating system, data, etc., system registry or configuration information, installed device drivers, etc.) for execution on the target machine may be difficult or imperfect. By introducing a boot loader into an encapsulation of virtual machine state, it is possible to initiate the desired transformation(s) upon boot of (or upon loading of a corresponding image into) the target machine. In this way, an in-place conversion of virtual machine state can be performed, thereby facilitating migration to a hardware system or to another virtual machine of dissimilar configuration. Often, the target machine is a physical machine that exhibits at least one configurational difference when compared with the virtual machine. In some cases, target machine may be an underlying physical machine that previously hosted a virtualization environment in which the virtual machine executed.

In general, embodiments of the present invention may be exploited in encodings of virtual machine data that employ any of a variety of underlying storage technologies, including local disk storage, network storage (including storage area network (SAN) mediated storage and network attached storage technologies), even portable and/or removable media. Using one or more embodiments of the present invention, it is possible to dynamically convert encapsulated operating system images into a form that may be booted or loaded on a physical server or other target. Once converted, the images may, in many cases, be converted back for execution in a virtualized environment.

In accordance with one or more embodiments, a virtualization system can expose data that encodes an operating system partition, while still securing sensitive virtual machine metadata such as that which encodes swap state, virtual hardware configuration and/or snapshot or checkpoint states. Typically, such metadata includes backing state data corresponding to internal states of devices, memory and other system components virtualized by or for a given virtual machine. As such, even unsecured read access to such metadata (e.g., by a guest) can leak or compromise sensitive information, while unsecured write access may afford malicious code or users with an attractive vector for attack.

For concreteness of description and as an example of "virtual machine metadata," particular organizations of backing state data are illustrated that encode internal states of devices, memory and other system components virtualized by or for a given virtual machine. Similarly, as an example of "virtual disk" data, information exposed to a guest application or operating system by a virtualization system as a virtual primary (secondary, tertiary . . . ) disk is illustrated. For avoidance of doubt, note that underlying encodings of both virtual machine metadata and virtual disk data may reside in media that includes or constitutes disk storage.

Embodiments are described wherein virtual machine data is encoded using network storage technology in units of storage allocated from pooled network storage shared amongst virtualization systems. However, network storage is not essential. Rather, based on the description herein, persons of ordinary skill in the art will appreciate that one or more embodiments of the present invention may employ other storage technologies and configurations. Accordingly, in view of the foregoing and without limitation, embodiments of the present invention are described as using certain illustrative network storage embodiments.

As used herein, the term network storage refers generally to storage systems and storage array technology, including storage area network (SAN) implementations, network attached storage (NAS) implementations, and other storage architectures that provide a level of virtualization for underlying physical units of storage. In general, such storage architectures provide a useful mechanism for sharing storage resources amongst computational systems. In some cases, computational systems that share storage resources may be organized as a coordinated system (e.g., as a cluster or cooperatively managed pool of computational resources or virtualization systems). For example, in a failover cluster it may be desirable to share (or at least failover) virtual machine access to some storage units. Similarly, in a managed collection of virtualization systems, it may be desirable to migrate or otherwise transition virtual machine computations from one virtualization system to another. In some cases, at least some computational systems may operate independently of each other, e.g., employing independent and exclusive units of storage allocated from a storage pool (or pools) provided and/or managed using shared network storage.

Generally, either or both of the underlying computer systems and storage systems may be organizationally and/or geographically distributed. For example, some shared storage (particularly storage for data replication, fault tolerance, backup and disaster recovery) may reside remotely from a computational system that employs it. Of course, as will be appreciated by persons of ordinary skill in the art, remoteness of shared storage is a matter of degree. For example, depending on the configuration, network storage may reside across the globe, across the building, across the data center or across the rack or enclosure. In embodiments that provide virtual machine migration, cloning, failover etc. (e.g., from one virtualization system to another) the ability to share a given unit of storage with, or at least transition access to, another (potentially remote) computational system can be quite useful.

Nonetheless, while certain embodiments in accordance with the present invention, particularly cluster-organized and/or enterprise scale systems, may build upon or exploit data distribution, replication and management features of modern network storage technology, it is important to recognize that at least some aspects of the present invention may be exploited in more modest computational systems that employ network storage technology. For example, even a single computer system may employ SAN-type storage facilities in its storage architecture. Accordingly, while the description that follows emphasizes certain exemplary embodiments in which network storage can be shared and at least some underlying elements thereof may be remote, persons of ordinary skill in the art will understand that for at least some embodiments, network storage need not be shared or remote.

In some embodiments of the present invention, particularly those that employ SAN-type storage arrays, block-level I/O access to virtual machine state data can afford performance advantages. Accordingly, certain embodiments are described herein in which non-commingled, encapsulated representations of virtual machine state are maintained in distinct storage volumes (or LUNs) of a SAN. Nonetheless, other embodiments, including those that employ NAS-type or file system-mediated access mechanisms may still allow a virtualization system to exploit the described, encapsulation and/ or isolation techniques to limit access (e.g., by a guest application or operating system) to underlying virtual machine data.

Finally, and again for concreteness, embodiments based on facilities, terminology and operations typical of certain processor architectures and systems, and based on terminology typical of certain operating systems, virtualization systems, storage systems and network protocols and/or services are described. That said, embodiments of the present invention are general to a wide variety of processor and system architectures (including both single and multi-processor architectures based on any of a variety of instruction set architectures), to numerous operating system implementations and to systems in which both conventional and virtualized hardware may be provided. As described herein, embodiments of the present invention are also general to a variety of storage architectures, including storage virtualization systems such as those based on storage area network (SAN) or network attached storage (NAS) technologies, as well as storage architectures that employ local disk media, removable media, etc.

Accordingly, in view of the foregoing and without limitation on the range of underlying processor, hardware or system architectures, operating systems, storages architectures or virtualization techniques that may be employed in embodiments of the present invention, based on these embodiments, and on the claims that follow, persons of ordinary skill in the art will appreciate a broad range of suitable implementations and exploitations.

Conversion of Virtual Machine State

Users of virtualization technology, including information technology (IT) administrators and individuals, can find it useful to convert a virtual machine to a physical machine. More particularly, such users may wish to take an operational state of a virtual machine, provisioned to expose a configured set of virtual resources (disk storage, memory, processor, devices, etc.) for execution of guest computations, typically a guest operating system and the applications/services it supports, and to migrate that state so as to boot or load those guest computations on a hardware machine, or other target.

Using embodiments of present invention described herein, such an IT administrator may operate a server provisioned as a virtual machine with its installed and configured guest operating system and applications and transition or migrate the configuration to (or on) a physical server for execution. Similarly, an individual (or IT administrator) may operate a virtual machine that exposes a Microsoft® Windows based personal computer (or "wintel" machine) running on underlying an iMac® computer and transition or migrate the configuration to execute on an Intel® processor-based hardware machine. Microsoft Windows is a trademark of Microsoft Corporation. iMac is a trademark of Apple Inc.

In general, an ability to transition or migrate from a virtual machine to a physical machine may be useful for problem reproduction, disaster recovery, performance, or future proofing of deployments. For example, when faced with a problem or bug in an application running in a virtualization environment, an application vendor may (in some cases) request or require the customer reproduce the problem in a physical environment to eliminate the possibility that the problem was introduced by a virtualization layer. Embodiments described herein can be employed to provide such a customer with a method to convert its virtual machine to a physical machine, reproduce the problem, and once reproduced and/or debugged, convert back to a virtual machine.

Virtualization can also provide a solution for disaster recovery. For example, virtualization technology is often employed at both primary and recovery sites or simply at the recovery site to restore services interrupted by a disaster, hardware failure or connectivity loss. Nonetheless, some customers running virtualization at a primary site may want to use physical servers at their disaster site. They may not require all their virtual machines be recovered, but instead only care about a few critical systems. Indeed, a disaster recovery plan may be as simple as shipping tape backup to a remote site and restoring virtual machine state to a physical server in the event of a disaster. In these scenarios, virtualization software may not be available at the remote/recovery site, or the remote staff may not be skilled in virtualization management. As a result, it may be useful to provide an ability to boot virtual machine images on physical servers and thereby simplify the recovery process.

Finally, in many enterprises, software upgrade cycles are infrequent. This practice can result in upgrade cycles where a customer upgrades from a very old version to a much newer version of a software product. Sometimes software product lines may change significantly or the customer may shift to a different product entirely, instead of just upgrading to a newer version of the old product. Indeed, in some cases, the new version or new product may not even be supported on the legacy hardware machine virtualized. Alternatively, upgrade or conversion utilities may presume or require some aspect, feature or resource of a physical machine execution environment. Accordingly, a method that allows a user or administrator to convert a virtual machine to a physical machine, and then convert back into a newer virtual machine image may present the only method of upgrade guaranteed to work.

These and other embodiments of virtual-to-physical (V2P) methods (or more generally, of virtual-to-target (V2T) methods) described herein will be understood with reference to FIG. 1, which depicts an encapsulated representation of virtual machine state and configuration data that, consistent with one or more embodiments of the present invention, may be employed as a boot (or load) image for a target system. In particular, virtualization system 112 exposes resources (including virtual disk 130 encapsulated within storage volume 120) of a virtual machine 113 on which guest software executes. Typically, guest software includes an operating system and associated applications executable in coordination therewith. In the illustrated configuration, storage volume 120 is organized (or at least presented to virtualization system virtualization system 112) as storage allocated or provisioned for block level I/O access. Note that, as described elsewhere herein, storage volume 120 need not be implemented as a unitary physical disk, but rather may be provisioned from a variety of underlying storage media presented using modern storage virtualization techniques such as using SAN technology.

Storage volume 120 includes partition table 121, partition map or similar construct that identifies two constituent partitions, one that itself encapsulates virtual disk 130 and a second metadata partition 122 that encodes information specific to the configuration and state of a virtual machine. Typically, encapsulated virtual disk 130 is exposed to virtual machine 113 as a primary virtual disk that encodes an image of a guest operating system that coordinates execution of computations on virtual machine 113. Metadata partition 122 encodes configuration data (VMX) that defines the hardware system virtualized as well as a backing representation (SWAP) of state used by virtualization system 112 in its virtualization or emulation of resources of virtual machine 113. Based on the particulars of virtual machine configuration data (e.g., type of processor virtualized, type of virtual network card, type of virtual storage host bus adapter (HBA), amount of memory virtualized, etc.), virtualization system 112 instantiates virtual machine 113 and exposes resources thereof to guest software, including the aforementioned guest operating system and applications coordinated thereby. Exposed resources include virtual processor(s) including register states thereof, memory and paging spaces, virtual device and states thereof, etc. (as typical of virtualization systems known in the art), together with virtual disk resources including at least encapsulated virtual disk 130.

Backing representation SWAP encodes execution state for virtual machine 113 at a particular time whether or not suspended. For example, backing state data often includes an image (or other coding) of current data in all or a portion of a memory utilized by a virtual machine (e.g., instruction and/or value data in the virtual machine's RAM, cache, registers, etc.). Optionally, explicit or implicit snapshot data SS may be encoded in connection with backing state data in metadata partition 122. Typically, snapshot data SS will be maintained using facilities of a storage system (not separately shown) that transparently support snapshot, checkpointing, state cloning, rollback and/or other related operations without necessarily exposing underlying storage of data for incremental/successive states. For example, snapshot facilities available in modern commercial SANs are typically space efficient (employing copy-on-write and/or delta state technology) and typically provide transparent checkpointing and rollback support for a succession or hierarchy states related to a baseline. Accordingly, snapshot data SS is illustrated as an adjunct to backing state data SWAP although other representations may be employed, if desired.

Like storage volume 120 in which it is encapsulated, virtual disk 130 includes its own partition table 131, partition map or similar construct that identifies constituent partitions thereof. Virtual disk 130 is exposed by virtualization system 112 as a disk, typically as a disk that includes the primary boot partition for a guest operating system executable on virtual machine 113. In the illustration of FIG. 1, two constituent partitions OS and D1 are shown in which operating system and user data may respectively reside. Often, and in particular for Microsoft® Windows operating system deployments that follow standard partitioning schemes, a primary boot partition (such as illustrated partition OS) encodes a "C: drive," where the operating system, user data, applications, and operating system page file all reside, although other common schemes segregate certain data (e.g., user data) in a separate partition such as illustrated partition D1. In Unix-type operating systems, including BSD, Linux, Solaris® and even Mac OS X operating system, other partitioning schemes are typically employed. Accordingly, persons of ordinary skill in the art will readily understand that partitions of encapsulated virtual disk 130 of FIG. 1 may be employed as partitions for /boot and /usr file systems that may be exposed to a Unix-type guest operating system or other partitions in accordance with requirements or conventions of another operating environment.

If (or when) a transition from virtual machine 113 to target system 114 is desired, storage volume 120 can be accessed by target system 114 and suitable transformations can be initiated to conform or adapt information content of virtual disk 130 (typical registry or other configuration state encoded in connection with an operating system image) to the particular needs or expectations of target system 114. In the illustrated configuration, virtual-to-target (V2T) boot loader 123 is introduced into metadata partition 122 and configured as a bootstrap vector for initiating such transformations. For concreteness of description, embodiments of the present invention are described that employ certain well understood bootstrapping mechanisms employed in conventional personal computers and Microsoft® operating systems; however, based on the description herein, persons of ordinary skill in the art will appreciate a variety of variations and adaptations suitable to these and other computational systems. For generality, a virtual-to-target (V2T) embodiment is illustrated in which target system 114 may constitute a physical machine or some alternative target, such as a virtual machine that differs (e.g., in configuration or resources) from virtual machine 113. Later, certain aspects particular to virtual-to-physical (V2P) embodiments are described.

Accordingly, in certain exemplary embodiments of the present invention, metadata partition 122 is identified as a boot or load partition in accordance with operative conventions of the target system and boot loader 123 defines or identifies at least an initial sequence of operations that performs (or initiates performance) of the desired transformations. For example, in an illustrative system conforming to BIOS conventions originated for IBM-compatible personal computers running Microsoft Windows operating systems, a master boot record or MBR (which may appear as the first sector of storage volume 120) identifies (using an appropriate type code) metadata partition 122 as an active primary partition and is employed to initiate V2T boot loader 123 in accordance with a volume boot record encoded in a first sector of metadata partition 122.

Thus, in some embodiments, upon boot (or load) of target system 114, a transformative sequence of operations is initiated based on contents of a master boot record or other construct employed in storage volume 120 to identify V2T boot loader 123 (in metadata partition 122). Exemplary transformative sequences are described in greater detail below; however, for simplicity of our initial description, two transformative aspects are typical. First, V2T boot loader 123 (either itself or through code that it directly or indirectly initiates) modifies partition table 121 of storage volume 120 to directly identify (and effectively de-encapsulate) partitions, including the partition OS, of virtual disk 130 and to flag V2T boot loader 123 as bootable. Second, if necessary, V2T boot loader 123 (either itself or through code that it directly or indirectly initiates) executes operating system specialization code to conform the operating system image in partition OS with particulars of target system 114.

In some embodiments, operating system specialization code modifies registry or other configuration data consistent with differences between virtual machine 113 and target system 114, such as differing processor, memory or device configurations. Note that in support of some transitions from virtual to target machine, few if any modifications may be necessary. Indeed, in some exploitations or transitions, differences between configurations of virtual machine 113 and target system 114 may be limited to variances for which a given operating system implementation is capable of self configuring, e.g., through plug-and-play or other auto configuration mechanism, on boot.

Of course, persons of skill in the art of bootstrap configurations will recognize that it is often useful to employ a cascade of boot or load sequences; each less constrained by coding space or other resources limits than its predecessor. Accordingly, the operational description herein of V2T boot loader 123 includes, and will be understood to encompass, one or more sequences of operations that may be triggered or initiated responsive to V2T boot loader 123, whether or not coded entirely within a particular coding extent such within as the first sector of metadata partition 122.

Figure 2:
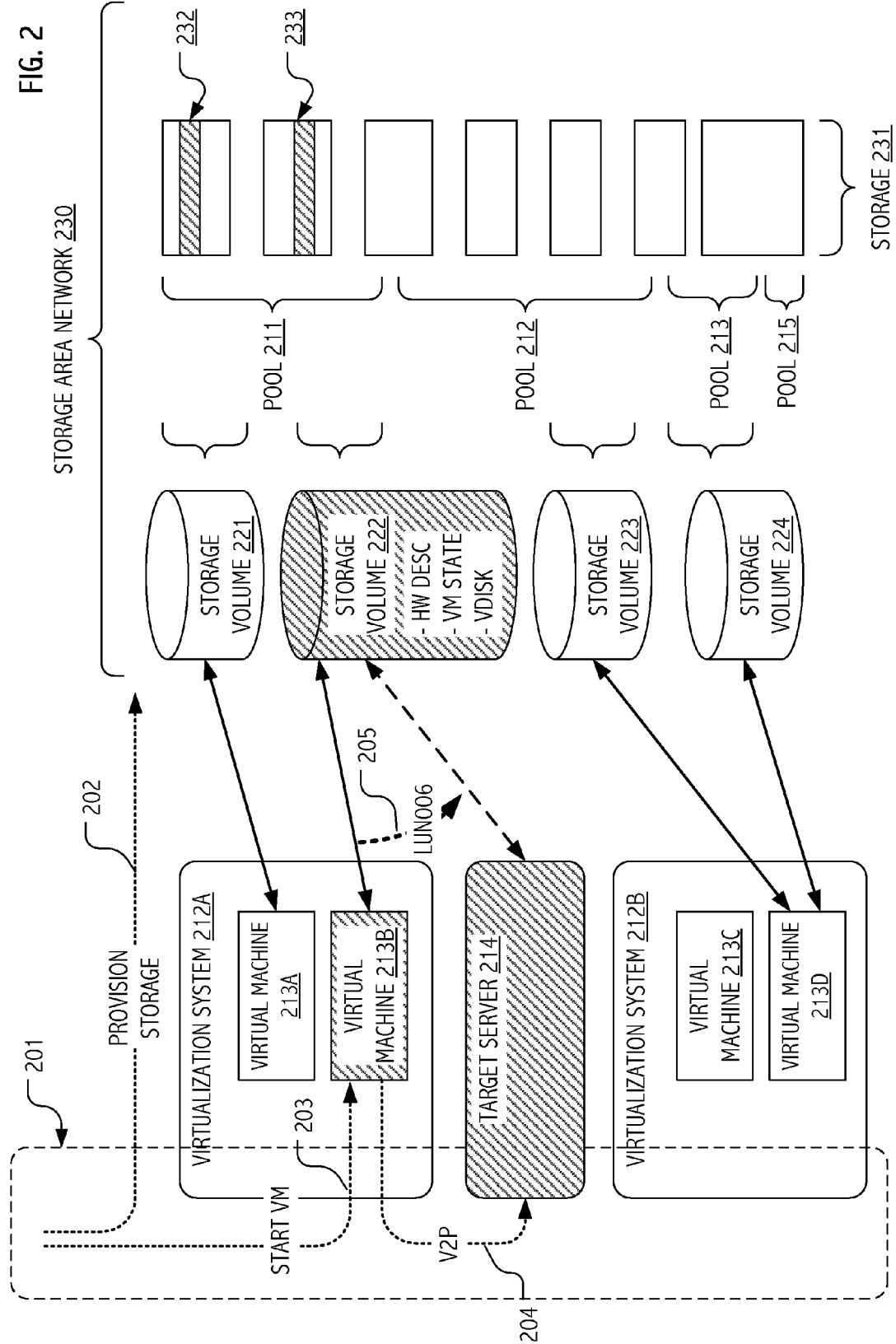
FIG. 2 illustrates an embodiment of a virtual-to-physical (V2P) migration and/or failover of system state of a virtual machine to a target physical machine using a storage area network (SAN) mediated encapsulation of virtual machine state and guest operating system/user disk data in a storage volume.

FIG. 2 illustrates an embodiment of virtual-to-physical (V2P) migration and/or failover 204 of system state of virtual machine 213B to a target physical machine (e.g., server 214)

using storage area network (SAN) mediated encapsulation of an exposed virtual disk and virtual machine state such as described above with reference to FIG. 1. Although the illustration of FIG. 2 is generally consistent with a data center or enterprise deployment, persons of ordinary skill in the art will recognize the applicability of embodiments described and/or illustrated to other scales and deployment complexities. Consistent with the data center focus, a coordination and provisioning system 201 (such as VMware® VirtualCenter) is employed to provision storage (202) from underlying storage media 231 (and pools 211, 212, 213 and 215) of storage area network (SAN) 230 and to provision, control and coordinate (see 203) execution of virtual machine instances (e.g., VMs 213A, 213B, 213C and 213D) on respective virtualization systems 212A and 212B. However, coordination and provisioning systems need not be employed in all embodiments of the present invention and based on the description herein, persons of ordinary skill in the art will appreciate embodiments with and without coordination/provisioning system support. In particular, some or all aspects of V2P migration/failover 204 (including the previously described modifications to partition tables and operating system specialization) may be effectuated (205) without provisioning system coordination.

Thus, portions 232 and 233 of storage 231 are provisioned from pool 211 as storage volume 222 (LUN006) which encodes an encapsulation of an exposed virtual disk(s) and virtual machine state such as described above. As before, a V2P boot loader that has been introduced into the encapsulation facilitates boot- or load-time modifications (by target server 214) to partition tables of storage volume 222 and operating system specialization of an operating system image encapsulated within a virtual disk previously exposed to virtual machine 213B.

Figure 3:
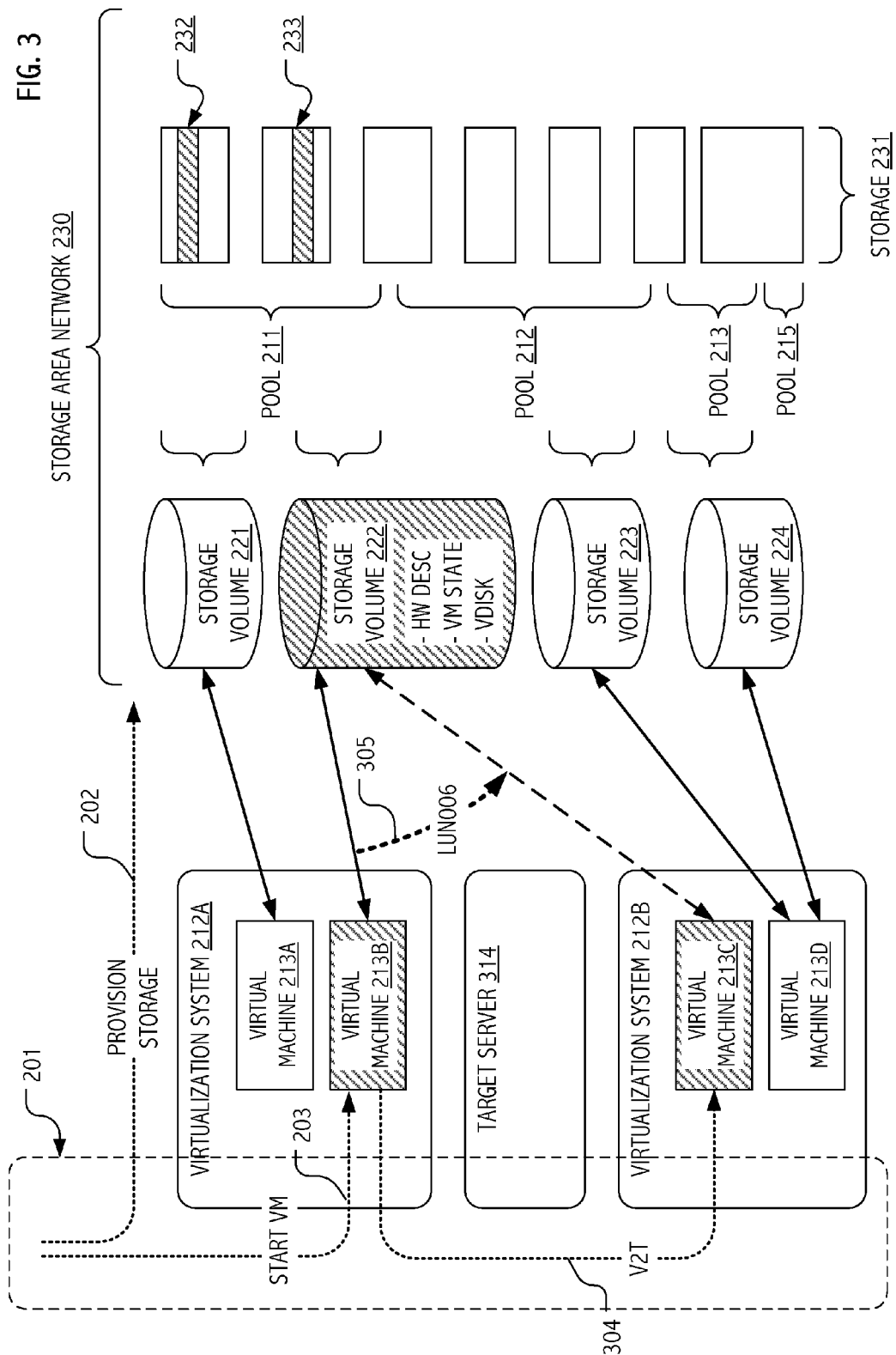
FIG. 3 illustrates an embodiment of an analogous V2T migration and/or failover to an alternative virtual machine target.

FIG. 3 illustrates an embodiment of analogous virtual-to-target (V2T) migration and/or failover 304 to an alternative target (namely, virtual machine 213C executable on virtualization system 212B). As before, storage volume 222 (LUN006) encodes an encapsulation of an exposed virtual disk(s) and virtual machine state such as described with reference to FIG. 1. In this case, a V2T boot loader that has been introduced into the encapsulation facilitates specialization (in accord with differing particulars of virtual machine 213C) of an operating system image encapsulated within a virtual disk previously exposed to virtual machine 213B. Notwithstanding the significance of virtual-to-target (V2T) embodiments, the following describes virtual-to-physical (V2P) embodiments. Nonetheless, based on the description herein, persons of ordinary skill in the art will appreciate the applicability of embodiments of the present invention to a range of execution targets, be they physical or virtual.

Figure 4:
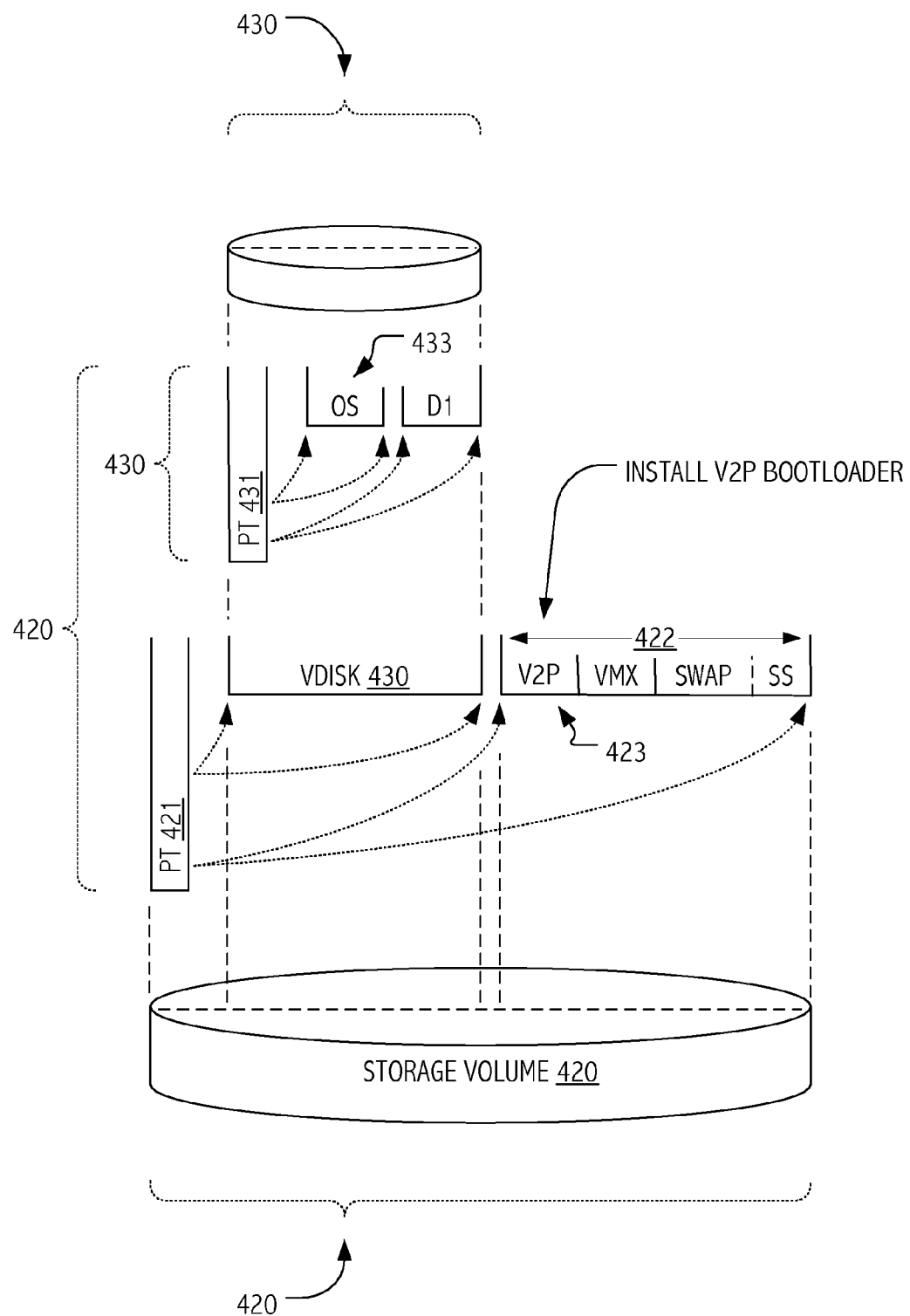
FIG. 4 illustrates an organization, and functional interrelationships, of elements of an illustrative storage volume encapsulation of virtual machine state and guest operating system/user disk data that has prepared for use, by a target machine, as a boot or load image.
Figure 5:
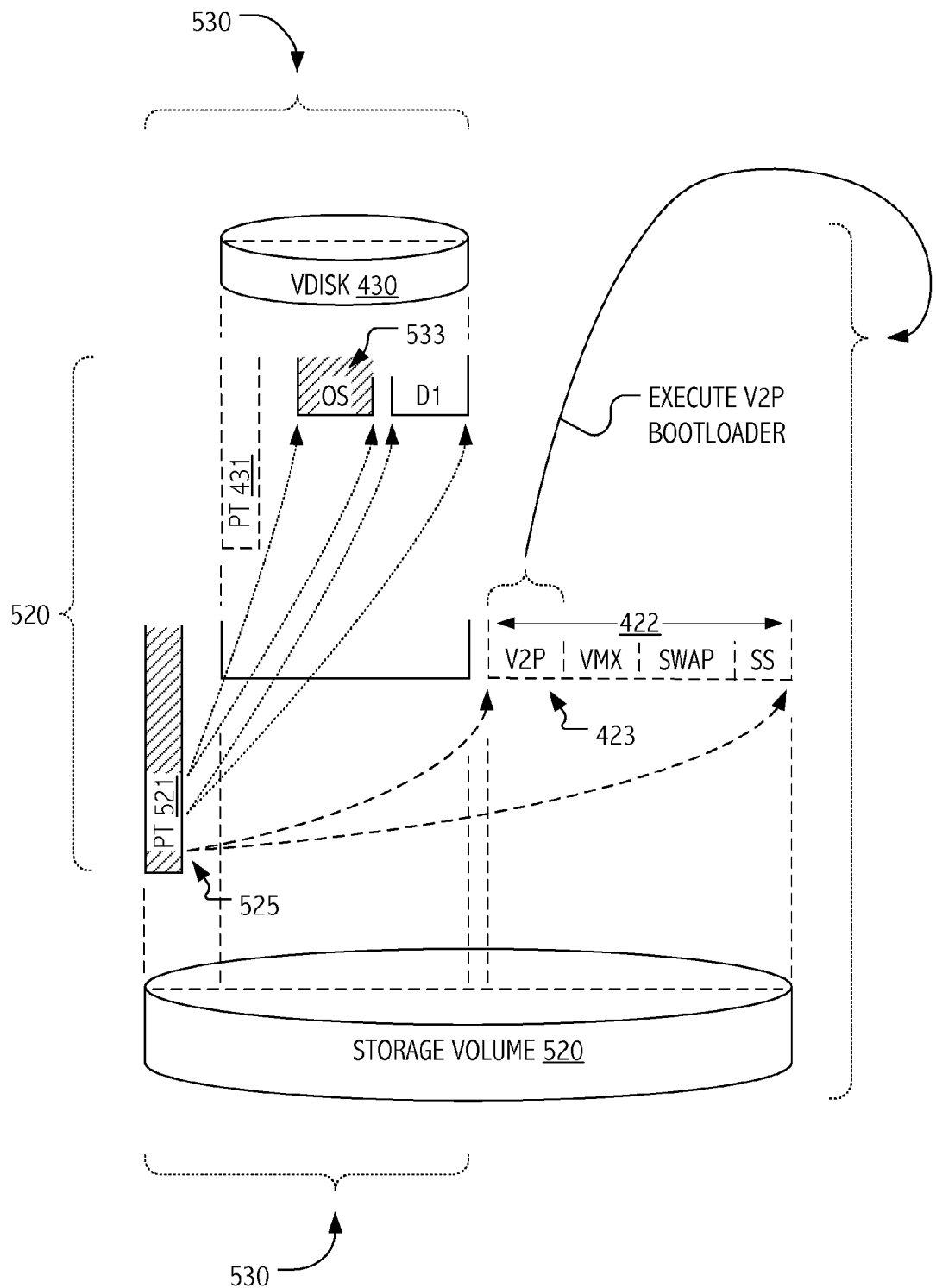
FIG. 5 illustrates an organization, and functional interrelationships, of elements of an illustrative storage volume encapsulation of virtual machine state and guest operating system/user disk data that has been transformed, by operation of a specialized boot loader, for use on a target machine.

FIGS. 4 and 5 illustrate, for an encapsulated representation of virtual machine state and guest operating system/user disk data in accordance with some embodiments of the present invention, respective partition table states before and after execution of a specialized V2P boot loader. In particular, FIG. 4 illustrates the organization and functional interrelationships of elements of an illustrative storage volume encapsulation of virtual machine state and guest operating system/user disk data that has been prepared for use, by a physical machine, as a boot or load image. FIG. 5 illustrates the organization and functional interrelationships of elements of the illustrative storage volume encapsulation after it has been transformed by operation of the specialized boot loader, for use on a physical machine. For simplicity of illustration, a single encapsulated disk (virtual disk 430) is shown; however, more generally, additional encapsulated disks may be provided if desired.

Referring to FIG. 4, storage volume 420 includes partition table 421 that identifies the extent of at least two constituent partitions. A first such partition encapsulates virtual disk 430, while a second (metadata partition 422) encodes specialized V2P boot loader 423 together with information specific to the configuration and state of a virtual machine computation to which the virtual disk is exposed. V2P boot loader 423 is installed into metadata partition 422 and flagged (using any appropriate mechanism or boot convention) as part of a boot sequence to be executed by a target physical machine. For example, in some embodiments, partition table 421 is updated to identify metadata partition 422 as an active primary partition and placement of V2P boot loader 423 in a first sector thereof serves to introduce a desired set of transformations into a later executed boot or load sequence.

Transformations effectuated by V2P bootloader 423 (either directly by an initial sequence coded in metadata partition 122 or through code initiated thereby) typically include (1) modifications to partition table 421 of storage volume 120 to identify (and effectively de-encapsulate) partitions, including OS partition 433, of virtual disk 430 together with any additional user partitions and (2) operating system specializations to conform an operating system image in OS partition 433 with particulars of a target physical machine or server.

In the illustrated configuration, metadata partition 422 also includes configuration data (VMX) that defines a hardware system virtualized and a backing representation (SWAP) of state for a prior virtual machine computation. As before, snapshot data SS may be encoded in connection with backing state data. Given the presence of potentially sensitive metadata, V2P bootloader 423 may optionally code updates to partition table 421 that seek to obscure or hide contents of metadata partition 422 from processes eventually executed on the target physical machine. For example, V2P bootloader 423 transformations may delete page table entries from metadata partition 422 and/or truncate the apparent extent of storage volume 420 in an attempt to secure at least backing state (SWAP) and snapshot data (SS) that may remain in metadata partition 422 from prior execution on a virtual machine.

FIG. 5 illustrates a resultant transformed storage volume 520 in which an updated partition table 521 identifies those partitions previously encapsulated within virtual disk 430 (namely, OS partition 533 and associated user partition D1). FIG. 5 illustrates the state of storage volume 520 after V2P bootloader 423 has been executed by the target physical machine. Both partition table 521 and OS partition 533 have been modified. The updates to partition table 521 are straightforward since, prior to invocation of V2P bootloader 423 (see FIG. 4), partition table 421 identified virtual disk 430 which contained its own partition table 431 from which appropriate base adjustments to partition offsets (to OS partition 533 and user partition D1) can be calculated. These "re-baselined" offsets to OS partition 533 and user partition D1 are entered into partition table 521. In some cases, sufficient space may not be available in partition table 521 to encode new entries for partitions of the de-encapsulated virtual disk 430 together with preexisting entries. Accordingly, entries for the metadata partition 422 may be omitted from partition table 521, if necessary. In such cases, it may be useful to include in metadata partition 422 some recognizable marker (e.g., a predefined bit-pattern) to facilitate later rediscovery of the metadata partition, if necessary.

In FIG. 5, contents of partition table 431 are omitted for simplicity of illustration, although partition table 431 may continue to occupy a portion of the storage extent and may continue to identify OS partition 533 and user partition D1. Modifications to OS partition 433 include operating system specializations (such as registry updates, driver installs, etc.) to conform the operating system image therein with particulars of the target physical machine which executes V2P bootloader 423.

In the illustration of FIG. 5, V2P bootloader 423 may optionally code updates to partition table 521 that seek to obscure or hide contents of metadata partition 422 from processes eventually executed on the target physical machine. For example, transformations performed or initiated by V2P bootloader 423 may delete page table entries (525) for metadata partition 422 and/or truncate the apparent extent 530 of storage volume 520 to secure information that may remain in metadata partition 422 from the preceding virtual machine execution. In such cases, the apparent, post-V2P extent of storage volume 520 (at least to the target system) is illustrated as storage extent 530.

Figure 6:
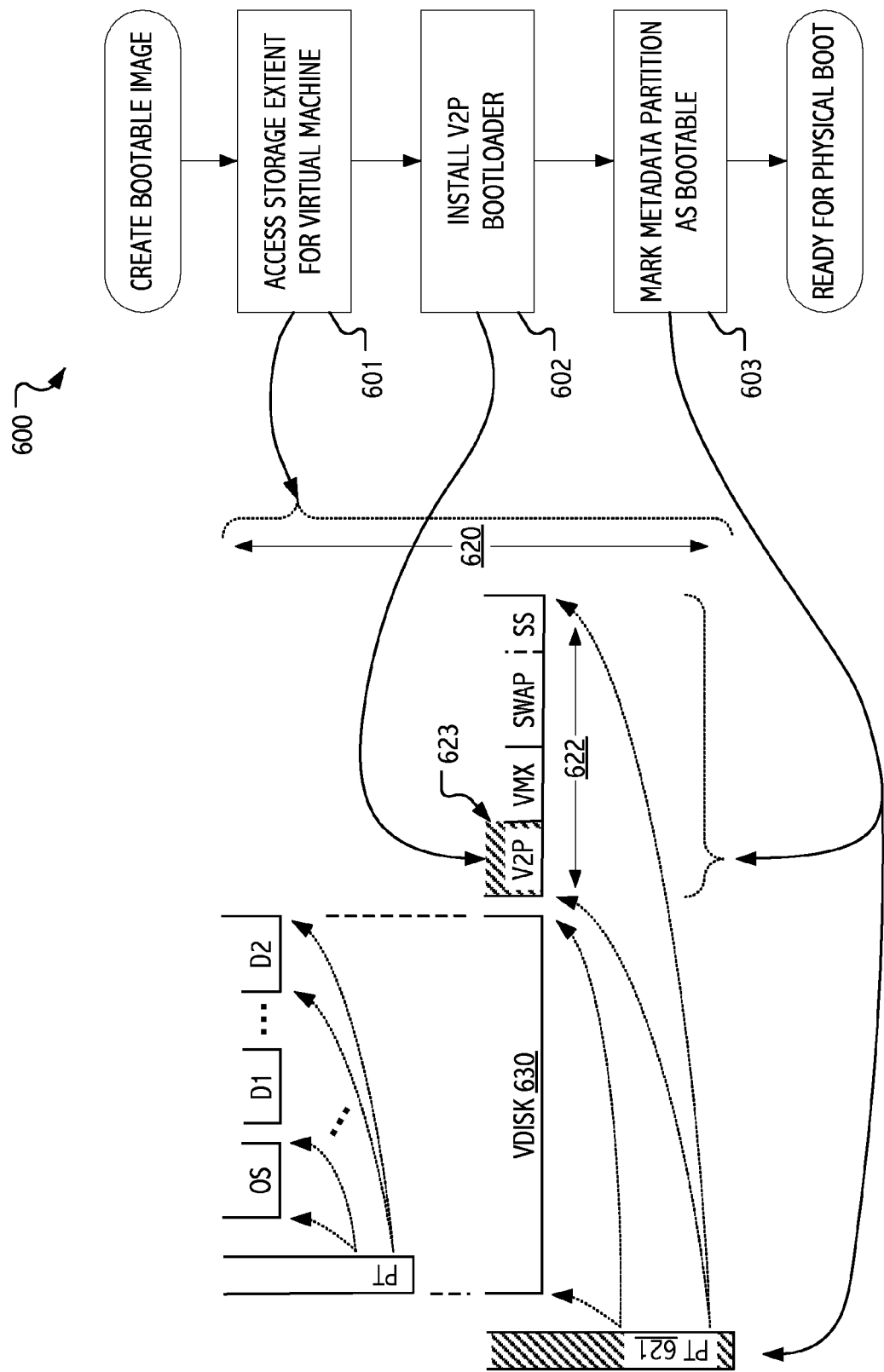
FIG. 6 illustrates a sequence of operations on an illustrative encapsulation of virtual machine state and guest operating system/user disk data, the operations preparing the encapsulated representation for use as a boot or load image.

FIG. 6 illustrates a sequence of operations 600 on an illustrative encapsulation 620 of virtual machine state and guest operating system/user disk data. The illustrated operations prepare the encapsulated representation for use as a boot or load image for a physical machine. In particular, the illustrated sequence accesses (601) the storage extent 620 employed in support of a virtual machine. As previously explained, the storage extent includes both (i) a virtual disk 630 that encapsulates partitions for an operating system image and user data and (ii) a metadata partition 622 that encodes information employed by a virtualization system in computations that expose the virtual machine to guest computations. Operations of the illustrated sequence (600) are typically performed under control of the virtualization system that exposes the virtual machine, although at least some of the operations may alternatively be performed by a boot image preparation tool or other software, if desired.

The illustrated sequence then installs (602) V2P bootloader 623. As before, the V2P bootloader may itself encode each of the desired transformations to storage extent 620 or may simply initiate a bootstrap cascade when executed. To facilitate automatic boot-sequence execution of the desired transformations, installed V2P bootloader 623 is flagged as bootable. For example, in accord with certain exemplary partitioning and boot sequence conventions, partition table 621 is updated to identify (603) metadata partition 622 as boot partition and V2P bootloader 623 therein as an operative boot sequence. Typically, placement of the V2P bootloader in an initial sector of storage that encodes the metadata partition is sufficient.

Figure 7:
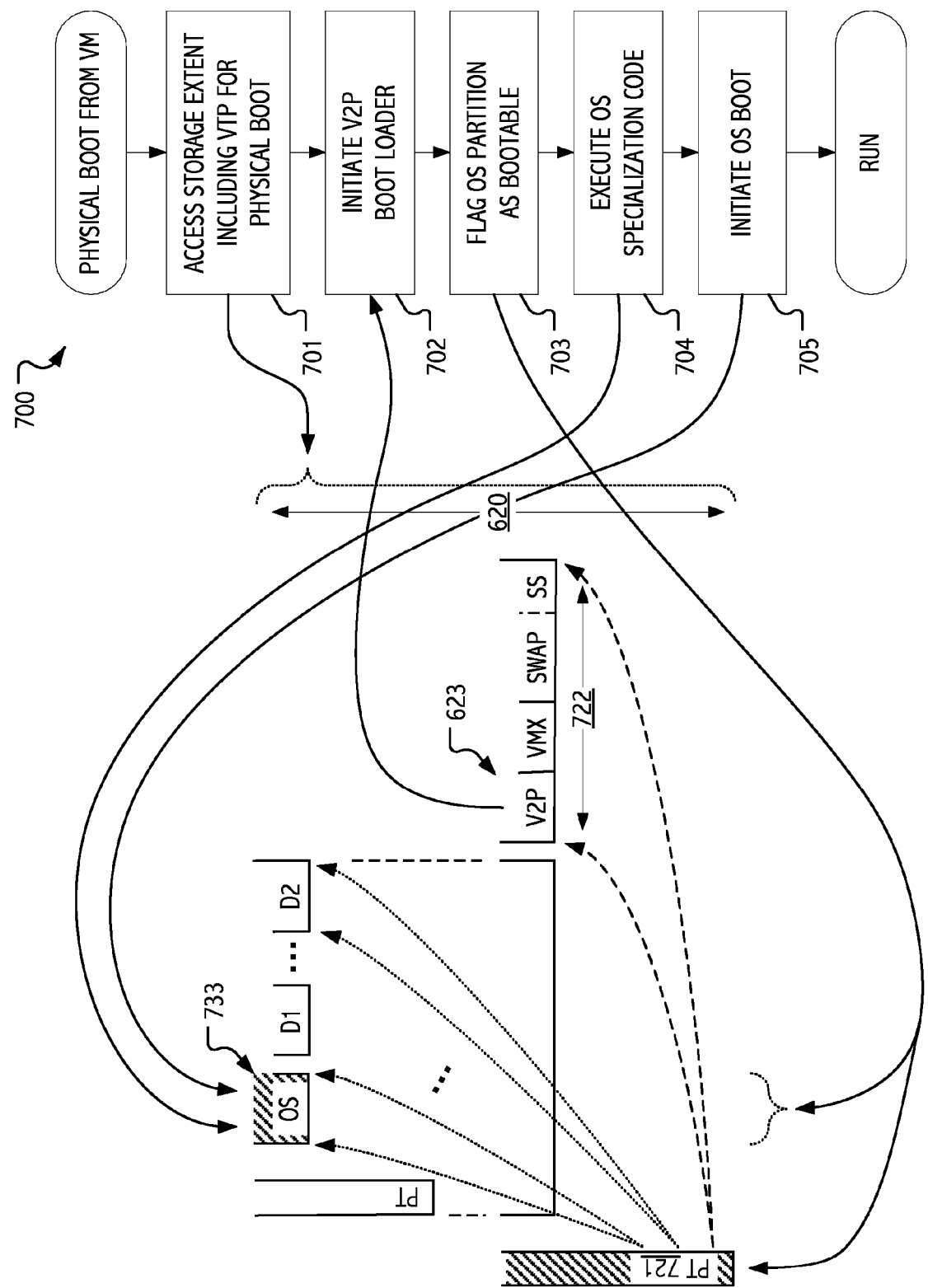
FIG. 7 illustrates a boot sequence of operations employing an illustrative encapsulation of virtual machine state and guest operating system/user disk data that has been prepared for use as a boot or load image.

FIG. 7 illustrates a boot sequence of operations 700 encoded within, and operative on, an encapsulation of virtual machine state and guest operating system/user disk data that has been prepared for use as a boot or load image for a physical machine. For example, in some embodiments, the encapsulation on which boot sequence 700 operates corresponds to that prepared in accordance with FIG. 6 (e.g., encapsulation 620 including V2P bootloader 623). In other embodiments, the encapsulation on which boot sequence 700 operates may be prepared in some other way. Accordingly, for concreteness of description only (and without limitation), boot sequence 700 is illustrated as operative on previously prepared encapsulation 620. Note that operations of the illustrated sequence (700) are typically performed under control of the physical machine that one attempts to boot based on state of the previously executed virtual machine, although at least some of the operations may alternatively be performed by a boot image preparation tool or other software, if desired.

Referring to the embodiment of FIG. 7, the illustrated sequence accesses (701) storage extent 620 which contains the previously introduced V2P bootloader 623. As previously described, and in accordance with certain exemplary partitioning and boot sequence conventions, a partition table has been updated to identify metadata partition 722 as boot partition and V2P bootloader 623 therein as an operative boot sequence. Accordingly, the boot of a physical machine based on contents of storage extent 620 initiates (702) operations coded or triggered by execution of V2P bootloader 623. In particular, the illustrated sequence marks (703) OS partition 733 as bootable typically in accordance with the same partitioning and boot sequence conventions that were initially employed to flag V2P bootloader 623 as bootable. Accordingly, in a typical configuration, updated partition table 721 identifies OS partition 733 as the primary active (and bootable) partition. As a result, an operating system bootloader prepared in accordance with operative conventions for the particular operating system image coded in OS partition 733 is effectively patched into at least future boot sequences. In some embodiments, V2P transformations may also map additional un-encapsulated secondary data disks in using the identifications appropriate to the target system.

Next, operating system specialization code is executed (704), if necessary. In general, appropriate specializations are operating system specific; however, specializations typically include updates to registry or other configuration data consistent with differences between the configuration of the physical system on which V2P bootloader 623 is now executed and that of the previous virtual machine. For example, specialization for differing processor, memory and/or device configurations may often be appropriate. Typically, in migrations of Microsoft® Windows operating system deployments, updates to entries of the Windows Registry and installation (if necessary) of appropriate device drivers into the operating system image encoded in OS partition 733 may be coordinated using conventional setup and deployment facilities of the operating system itself. For example, persons of ordinary skill in the art of Windows® operating system deployments will be familiar with execution of the Windows setup manager (typically setupmgr.exe) and with execution sysprep-type utilities based on directives coded in a sysprep.inf file.

Thus, in some embodiments in accordance with the present invention, operating system specializations are coded in accordance with conventional sysprep.inf syntax and execution (704) is performed by initiating the sysprep utility with an appropriately populated sysprep.inf file and with referenced drivers (e.g., for mass storage devices, network adapters, etc. of the hardware machine) available for installation under control of the sysprep utility. In this way, the operating system image encoded in OS partition 733 may be re-specialized with appropriate drivers for the target physical system. If the physical system requires a different hardware abstraction layer than the previously executed virtual machine (e.g., if the target physical machine is a multiprocessor and the previously executed virtual machine was configured as a uniprocessor, or vice versa), the sysprep.inf file can include an appropriate UpdateHAL entry. Typical specializations may also include Active Directory domain memberships, IP addresses, etc.

Similar specializations may be applied in other operating system environments. In any case, once any appropriate operating system specialization is complete, the resulting operating system image is booted. In general, V2P bootloader 623 may call the operating system bootloader in OS partition 733 or simply reset the physical machine and allow BIOS to trigger the operating system bootloader in accordance with a conventional boot sequence. In either case, an OS boot is initiated (705) on the target physical machine based on the previously executed virtual machine state.

In some embodiments, V2P bootloader 623 records its actions in a log maintained in any suitable place (e.g., in metadata partition 722) so that operations may be reversed at a later point in time to re-encapsulate the OS partition 733 and any related data partitions, e.g., in a physical-to-virtual (P2V) transition. In some P2V exploitations, a virtualization system may automatically discover encapsulated LUNs by checking for a specific partition type and optionally looking within the partition for a pre-defined bit-pattern. The same algorithm may be employed when scanning for de-encapsulated LUNs where there was room in the partition table for the metadata partition. When the system discovers a LUN with a partition table that does not address the entire disk, the system may calculate the expected location of the metadata partition based on the end of the last user partition, and read the block where the pre-defined bit-pattern should be.

Figure 8:
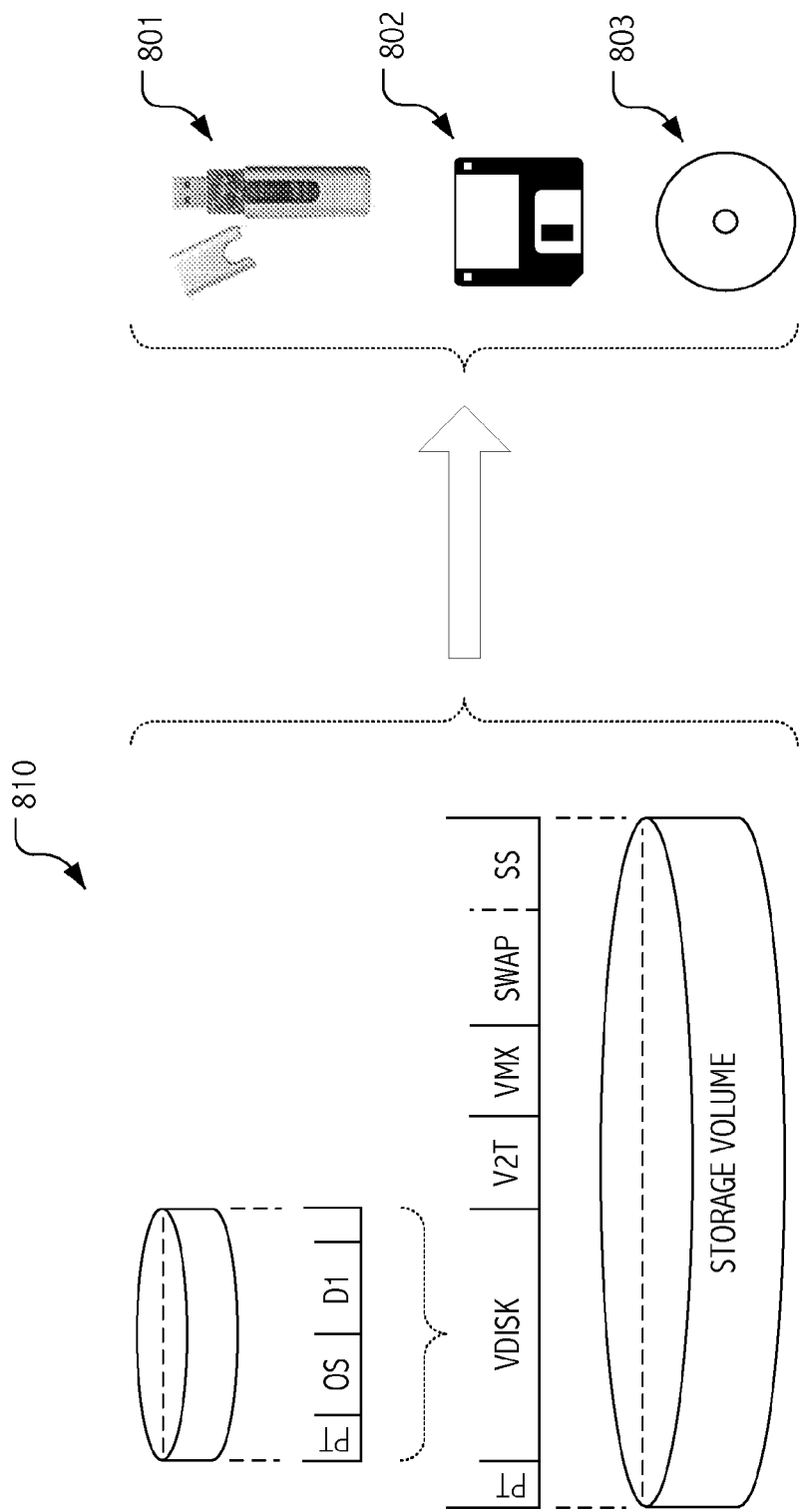
FIG. 8 depicts illustrative removable media encodings of the described encapsulated representations for transport to a target machine and use therewith as a boot or load image.

FIG. 8 depicts illustrative removable media (801, 802, 803) encoded with an encapsulated representation 810 of virtual machine state and guest operating system/user disk data suitable for transport to a target machine and for use therewith as a boot or load image. As described with regard to other embodiments, encapsulated representation 810 includes a V2T bootloader, such as V2P bootloader 623 (see FIGS. 6 and 7), which is executable by the target machine to de-encapsulate a virtual disk containing a operating system partition and to initiate specializations of an operating system image encoded therein to conform that operating system image with particulars of the target machine. In general, the previously described transformations may be performed on the removable media encoding(s) themselves or on a copy transferred from the removable media to other media used by the target machine.

Virtualization System Technology and Variations

FIGS. 1-3 (which have been described in detail herein) depict computational systems in which embodiments of the present invention may be employed to migrate a virtualization system to a target machine. In general, embodiments of the present invention will be understood in the context of any of a variety of virtual machines (or virtual computers) that are presented or emulated within a virtualization system on underlying hardware facilities. Virtualization systems are well known in the art and include commercial implementations, such as VMware® ESX Server™, VMware® Server and VMware® Workstation, available from VMware, Inc., Palo Alto, Calif.; operating systems with virtualization support, such as Microsoft® Virtual Server 2005; and opensource implementations such as available from XenSource, Inc.

Although certain virtualization strategies/designs are described herein, virtualization systems 112, 212A and 212B are representative of a wide variety of designs and implementations in which underlying hardware resources are presented to software (typically to operating system software and/or applications) as virtualized instances of computational systems that may or may not precisely correspond to the underlying physical hardware.

As is well known in the field of computer science, a virtual machine (VM) is a software abstraction—a "virtualization"—of an actual physical computer system FIGS. 1-3 illustrate aspects of virtualization systems in accordance with some embodiments of the present invention. In an effort to emphasize features relevant to the inventive concepts, certain aspects of more complete virtualization system implementations have been abstracted.

In general, some interface is provided between the guest software within a VM and the various hardware components and devices in the underlying hardware platform. This interface—which can generally be termed "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself. Unless otherwise indicated, embodiments of the present invention may be used (and/or implemented) in (or in conjunction with) virtualized computer systems having any type or configuration of virtualization software.

In view of the above, and without limitation, an interface usually exists between a VM and the underlying platform which is responsible for actually executing VM-issued instructions and transferring data to and from the memory and storage devices or underlying hardware. Subject to the foregoing, certain commercially available virtualization systems employ a "virtual machine monitor" (VMM) in this role. A VMM is usually implemented as a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual I/O devices can be presented as part of previously described VMs (see FIGS. 1-3), in some virtualization system implementations, these "components" are at least partially implemented as constructs or emulations exposed to a VM by the VMM. One advantage of such an arrangement is that the VMM may be set up to expose "generic" devices, which facilitate VM migration and hardware platform-independence. In general, such functionality may be said to exist in the VM or the VMM.

Figure 9:
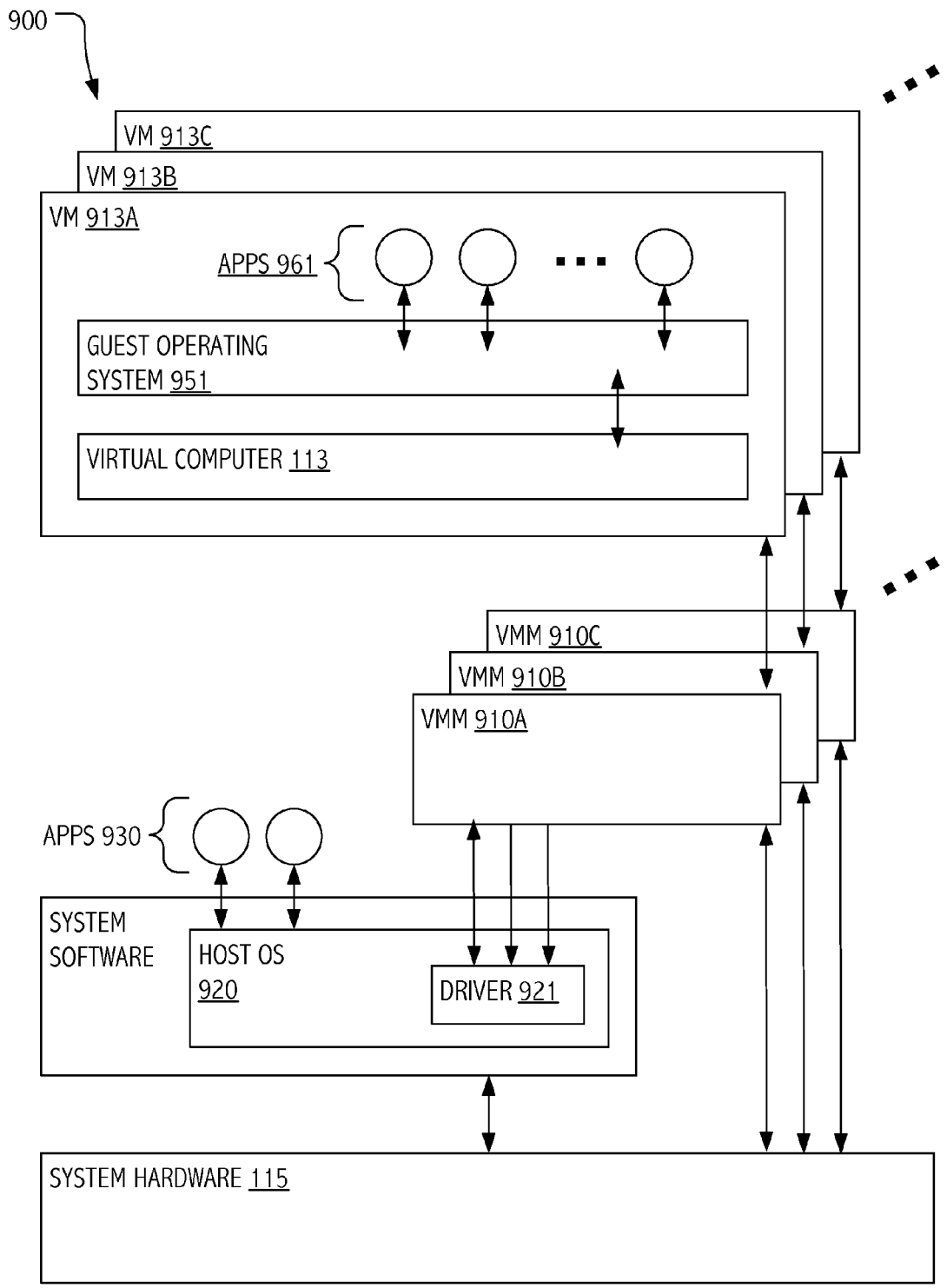
FIGS. 9 and 10 depict functional block diagrams of virtualization system configurations in accordance with respective embodiments of the present invention.
Figure 10:
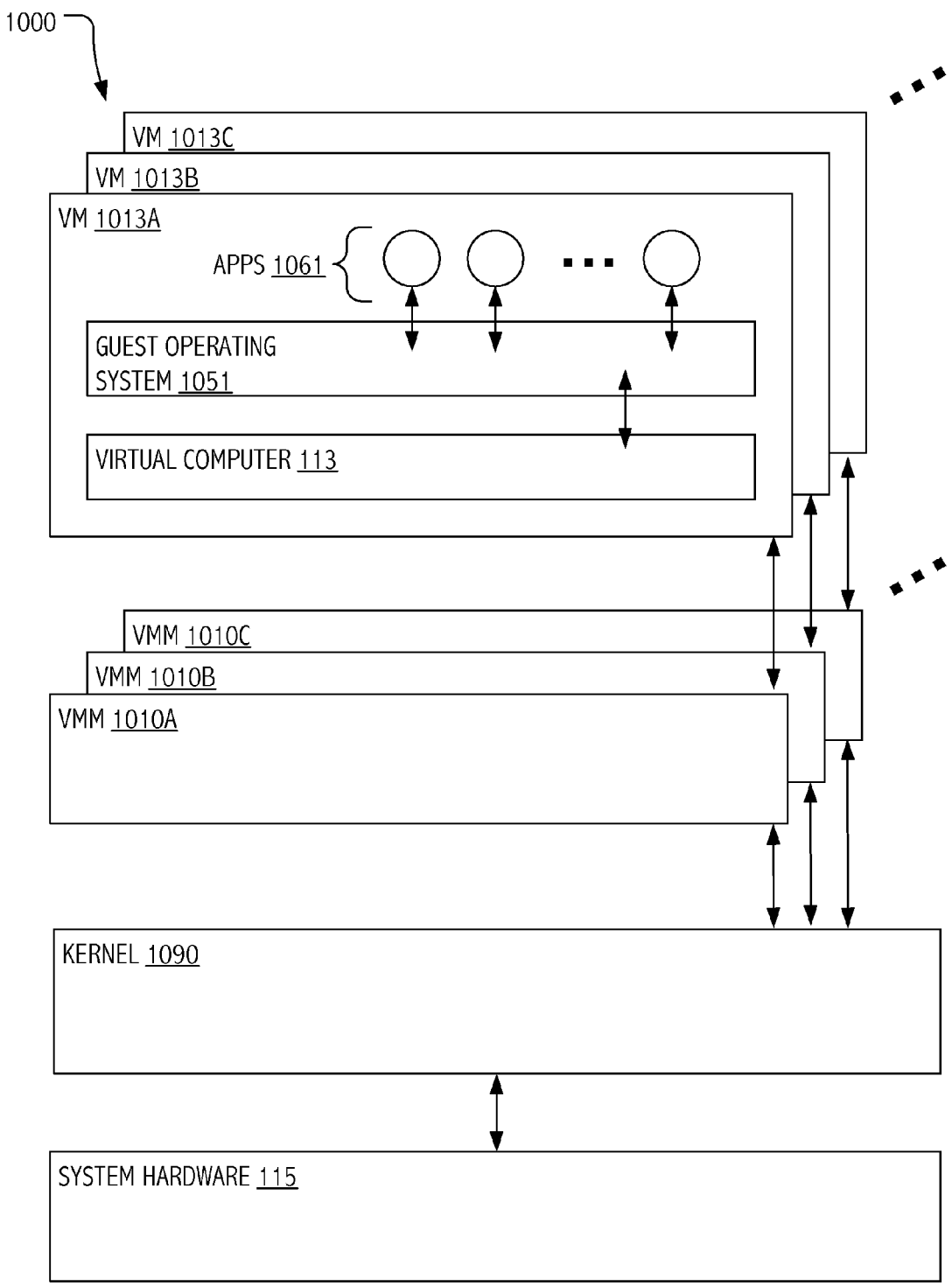

It should be noted that while VMMs can be viewed as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) execute in coordination with the host operating system. Such configurations, sometimes described as "hosted" and "non-hosted" configurations, are illustrated in FIGS. 9 and 10. In the hosted configuration, an existing, general-purpose operating system (OS) acts as a "host" operating system that is used to perform certain I/O operations. In the "non-hosted" configuration, a kernel customized to support virtual computers takes the place of the conventional operating system.

Embodiments of the present invention for migrating computations from a virtual machine to an alternate execution target (typically a physical machine) build on systems of either configuration. Accordingly, in view of the variations, two exemplary virtualization system configurations are summarized and, based on the preceding description, persons of ordinary skill in the art will appreciate suitable hosted and non-hosted implementations of the inventive concepts.

Hosted Virtual Computers

In FIG. 9, we illustrate a virtualization system configuration 900 commonly referred to as a "hosted" virtualized computer system in which a virtual machine monitor (e.g., VMM 910, VMM 910A, VMM 910B) is co-resident at system level with the host operating system 920 such that both the VMMs and the host operating system can independently modify the state of the host processor. VMMs call into the host operating system via driver 921 and a dedicated one of the user-level applications 930 to have the host OS perform certain I/O operations on behalf of the VM. The virtual computer in this configuration is thus hosted in that it runs in coordination with an existing host operating system. Virtualization systems that include suitable facilities are available in the marketplace. Indeed, VMware® Server virtual infrastructure software available from VMware, Inc., Palo Alto, Calif. implements a hosted virtualization system configuration consistent with the illustration of FIG. 9. VMware® Workstation desktop virtualization software, also available from VMware, Inc. also implements a hosted virtualization system configuration consistent with the illustration of FIG. 9.

Non-Hosted Virtual Computers

In FIG. 10, we illustrate a virtualization system configuration commonly referred to as a "non-hosted" virtualized computer system in which a dedicated kernel 1090 takes the place of and performs the conventional functions of a host operating system. Virtual computers (e.g., VM/VMM pairs) run on the kernel. Compared with a system in which VMMs run directly on the hardware platform, use of a kernel offers improved performance because it can be co-developed with the VMMs and optimized for the characteristics of a workload consisting of VMMs rather than a more general collection of tasks. Moreover, a kernel can also be optimized for I/O operations and it can facilitate provision of services that extend across multiple VMs (for example, for resource management). Virtualization systems that include suitable kernels are available in the marketplace. Indeed, ESX Server™ virtual infrastructure software available from VMware, Inc., Palo Alto, Calif. implements a non-hosted virtualization system configuration consistent with the illustration of FIG. 10. ESX Server is a trademark of VMware, Inc.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, virtualized computer system-based realizations of the present invention are not restricted to use in systems with any particular "degree" of virtualization and is not to be limited to any particular notion of full or partial ("para-") virtualization.

Other Embodiments

While the invention(s) is (are) described with reference to various implementations and exploitations, it will be understood that these embodiments are illustrative and that the scope of the invention(s) is not limited to them. In general, virtual machines may be implemented consistent with hardware system now existing or hereafter defined. In addition, while our description of virtualization techniques has generally assumed that the virtual machines present interfaces consistent with a hardware system, persons of ordinary skill in the art will recognize that the techniques described may be used in conjunction with virtualizations that do not correspond directly to any particular hardware system. Virtualization systems in accordance with the present invention, implemented as hosted embodiments, non-hosted embodiments or as embodiments that tend to blur distinctions between the two, are all envisioned.

Although achieving a goal of VMM transparency may be facilitated using techniques of the present invention, VMM transparency is not required. Rather, the virtualization system support for power management interfaces and mechanism may be incorporated in so-called "paravirtualization" systems in which a guest operating system is aware that it is being virtualized, and has an explicit interface to the VMM. In such systems, functionality analogous to that described herein as a VMM is sometimes referred to as a "hypervisor."

Many variations, modifications, additions, and improvements are possible. For example, while particular boot sequencing and storage partitioning techniques characteristic of Microsoft® Windows operating system implementations on IBM-compatible personal computer designs have been described in detail herein, applications to other operating systems and computer systems will also be appreciated by persons of ordinary skill in the art. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of making a bootable image for a computer, wherein the bootable image corresponds to a first virtual machine but is bootable on a target machine, the method comprising:
    instantiating the first virtual machine within a virtualization system and executing computations thereof, the computations operating upon an encapsulation of virtual machine state for the instantiated virtual machine; and
    introducing into the encapsulation, a boot loader that defines at least one transformation to be performed on the encapsulation to allow the target machine to boot from the virtual machine state;
    wherein the encapsulation of the virtual machine state is organized within a partitioned storage extent and includes a first disk partition that stores information usable as a file system by software executing on either the first virtual machine or the target machine and a second disk partition that stores the boot loader, a description of a hardware system virtualized by the first virtual machine, and backing state data that encodes an execution state for the first virtual machine at a particular time, wherein the storage extent has a partition table that identifies the second disk partition as boot partition, wherein the boot loader includes instructions, when executed, to update the partition table of the storage extent to identify the first disk partition as active partition, and wherein an update to the partition table is encoded by the boot loader to obscure or hide contents of the second disk partition from a process to be executed on the target machine.

2. The method of claim 1,
    wherein the first disk partition includes an operating system registry or system configuration database, and
    wherein the at least one transformation defined by the boot loader includes modification of the operating system registry or system configuration database to correspond to the target machine.

3. The method of claim 1,
    wherein the at least one transformation defined by the boot loader includes mapping at least one unencapsulated disk partition.

4. The method of claim 1,
    wherein the boot loader invokes operating system specialization code to prepare an operating system image for execution on the target machine.

5. The method of claim 1,
    wherein the target machine includes at least one device that requires a different driver than a corresponding device virtualized by the first virtual machine, and wherein the boot loader invokes a sequence to install the different driver.

6. The method of claim 1,
    wherein at least a first stage of the boot loader resides in the second partition.

7. The method of claim 1,
    wherein the storage extent includes a master boot record that identifies an active partition of the encapsulation containing at least a first stage of the boot loader.

8. The method of claim 1, wherein the target machine is one of:
    a hardware machine;
    a second virtual machine having a different configuration than the first virtual machine; and
    an underlying hardware machine upon which the virtualization system executed.

9. The method of claim 1, further comprising:
    booting the target machine using the encapsulation of the virtual machine state.

10. The method of claim 1, further comprising:
    executing the boot loader on the target machine and thereby transforming the encapsulation to allow the target machine to boot therefrom.

11. The method of claim 1, further comprising:
    encoding the encapsulation of the virtual machine state in storage accessible to both the virtualization system and the target machine.

12. The method of claim 1, further comprising:
    transporting a copy of the encapsulation of the virtual machine state and encoding same in storage accessible to the target machine.

13. A method of operating a target machine, the method comprising:
    accessing, as part of boot sequence on the target machine, a bootable image that includes an encapsulation of virtual machine state and a boot loader that defines at least one transformation to be performed on the encapsulation to allow the target machine to boot from the virtual machine state;
    executing the boot loader and thereby performing the at least one transformation; and
    booting the target machine using the transformed encapsulation,
    wherein the encapsulation of the virtual machine state is organized within a partitioned storage extent and includes a first disk partition that stores information usable as a file system by software executing on the target machine and a second disk partition that stores the boot loader, a description of a hardware system virtualized by a first virtual machine operating upon the encapsulation and at least partially defining the virtual machine state, and backing state data that encodes an execution state for the first virtual machine at a particular time,
    wherein the partitioned storage extent has a partition table that identifies the second disk partition as boot partition, the method further comprising:
    responsive to the boot loader, updating the partition table of the partitioned storage extent to thereafter identify the first disk partition as active partition, wherein updating the partition table of the partitioned storage extent comprising updating the partition table of the partitioned storage extent with an update that is encoded by the boot loader to obscure or hide contents of the second disk partition from a process to be executed on the target machine.

14. The method of claim 13,
wherein the at least one transformation defined by the boot loader includes modification of an operating system registry or system configuration database to correspond to the target machine.

15. The method of claim 13,
wherein the at least one transformation defined by the boot loader includes update of root partition table to de-encapsulate an operating system partition containing an operating system image previously executed on a virtual machine.

16. The method of claim 13, further comprising:
introducing the boot loader into the encapsulation of the virtual machine state.

17. The method of claim 13, further comprising:
executing computations of the first virtual machine within a virtualization system.

18. The method of claim 13, further comprising:
transporting the encapsulation of the virtual machine state to storage accessible to the target machine.

19. A computational system implemented in hardware that facilitates virtual-to-physical (V2P) machine migration by including in an encapsulation of virtual machine state, a boot loader that defines at least one transformation to be performed on the encapsulation in the course of a boot sequence to allow a target physical machine to boot from the virtual machine state, wherein the encapsulation of the virtual machine state is organized within a partitioned storage extent and includes a first disk partition that stores information usable as a file system by software executing on the target physical machine and a second disk partition that stores the boot loader, a description of a hardware system virtualized by a first virtual machine operating on the encapsulation and at least partially defining the virtual machine state, and backing state data that encodes an execution state for the first virtual machine at a particular time, wherein the storage extent has a partition table that identifies the second disk partition as boot partition, wherein the boot loader includes instructions, when executed, to update the partition table of the storage extent to identify the first disk partition as active partition, and wherein an update to the partition table is encoded by the boot loader to obscure or hide contents of the second disk partition from a process to be executed on the target physical machine.

20. The computational system of claim 19, further comprising:
a virtualization system that hosts the first virtual machine.

21. The computational system of claim 19, further comprising:
the target physical machine.

22. The computational system of claim 19, further comprising:
the encapsulation of the virtual machine state, including the boot loader.

23. A bootable image encoded in one or more non-transitory computer readable media, the bootable image encoding comprising:
a computer readable encoding of a virtual machine state encapsulated with a boot loader for a target machine that differs from a virtual machine,
the boot loader defining a sequence of instructions executable on a target physical machine to at least initiate a transformation of the encapsulation into a form that is bootable on the target machine,
wherein the encapsulation of the virtual machine state is organized within a partitioned storage extent and includes a first disk partition that stores information usable as a file system by software executing on the target physical machine and a second disk partition that stores the boot loader, a description of a hardware system virtualized by the virtual machine, and backing state data that encodes an execution state for the virtual machine at a particular time,
wherein the partitioned storage extent has a partition table that identifies the second disk partition as boot partition,
the bootable image further comprising:
the partitioned storage extent; and
instructions executable to modify the partition table of the partitioned storage extent to identify the first disk partition as active partition, wherein an update to the partition table is encoded by the boot loader to obscure or hide contents of the second disk partition from a process to be executed on the target physical machine.

24. The bootable image encoding of claim 23,
wherein the first disk partition includes an operating system registry or system configuration database, and
wherein the transformation includes modification of the operating system registry or system configuration database to correspond to the target machine.

25. The bootable image encoding of claim 23, wherein the boot loader includes:
instructions to map at least one unencapsulated disk partition for access by the target machine.

26. The bootable image encoding of claim 23, wherein the boot loader includes:
instructions executable to invoke operating system specialization code that prepares an operating system image for execution on the target machine.

27. The bootable image encoding of claim 23,
wherein the target machine includes at least one device that requires a different driver than a corresponding device virtualized by the virtual machine; and
wherein the boot loader invokes a sequence to install the different driver.

28. The bootable image encoding of claim 23,
residing in storage provisioned from and maintained as a storage unit of a storage area network (SAN), of network attached storage (NAS), of storage interfaced using a small computer systems interface over TCP/IP (iSCSI) protocol or as a virtual disk over hypertext transfer protocol (HTTP).

29. The bootable image encoding of claim 23,
residing in storage local to the target machine.

30. The bootable image encoding of claim 23, residing in a storage that is accessible to both the virtual machine and the target machine.

31. The bootable image encoding of claim 23, wherein the encoding is transportable or transmittable to the target machine.

32. A system comprising:
a virtualization system capable of hosting a first virtual machine;
a target machine; and
storage accessible to either or both of the virtualization system and the target machine, the storage encoding a virtual machine state from the first virtual machine encapsulated with a boot loader for the target machine, the boot loader defining a sequence of instructions executable on a target physical machine to at least initiate a transformation of the encapsulation into a form that is bootable on the target machine, wherein the encapsulation of the virtual machine state is organized within a partitioned storage extent and includes a first disk partition that stores information usable as a file system by software executing on either the first virtual machine or the target machine and a second disk partition that stores the boot loader, a description of a hardware system virtualized by the first virtual machine, and backing state data that encodes an execution state for the first virtual machine at a particular time, wherein the partitioned storage extent has a partition table that identifies the second disk partition as boot partition, wherein the boot loader includes instructions, when executed, to update the partition table of the partitioned storage extent to identify the first disk partition as active partition, and wherein an update to the partition table is encoded by the boot loader to obscure or hide contents of the second disk partition from a process to be executed on the target machine.

33. A computer program product encoded in one or more computer readable media selected from the set of disk, tape or other magnetic, optical or electronic storage media, the product comprising:

virtual-to-physical (V2P) machine migration code executable create a bootable image for a target physical machine, wherein the bootable image corresponds to virtual machine state but is bootable on the target physical machine; and boot loader code introducible by the migration code into an encapsulation of the virtual machine state, wherein the boot loader defines at least one transformation to be performed on the encapsulation by the target physical machine to allow the target physical machine to boot from the virtual machine state, wherein the encapsulation of the virtual machine state is organized within a partitioned storage extent and includes a first disk partition that stores information usable as a file system by software executing on the target physical machine and a second disk partition that stores the boot loader, a description of a hardware system virtualized by a first virtual machine operating on the encapsulation and at least partially defining the virtual machine state, and backing state data that encodes an execution state for the first virtual machine at a particular time, wherein the storage extent has a partition table that identifies the second disk partition as boot partition, wherein the boot loader includes instructions to update the partition table of the storage extent to identify the first disk partition as active partition, and wherein an update to the partition table is encoded by the boot loader to obscure or hide contents of the second disk partition from a process to be executed on the target physical machine.

34. The method of claim 1, wherein a page table entry from the second disk partition is deleted by the boot loader.

* * * * *